Aug. 12, 1969    C. GOODMAN    3,461,291
WELL LOGGING DEVICE USING A PULSED SOURCE OF
MONOENERGETIC NEUTRONS
Original Filed March 11, 1952    3 Sheets-Sheet 2

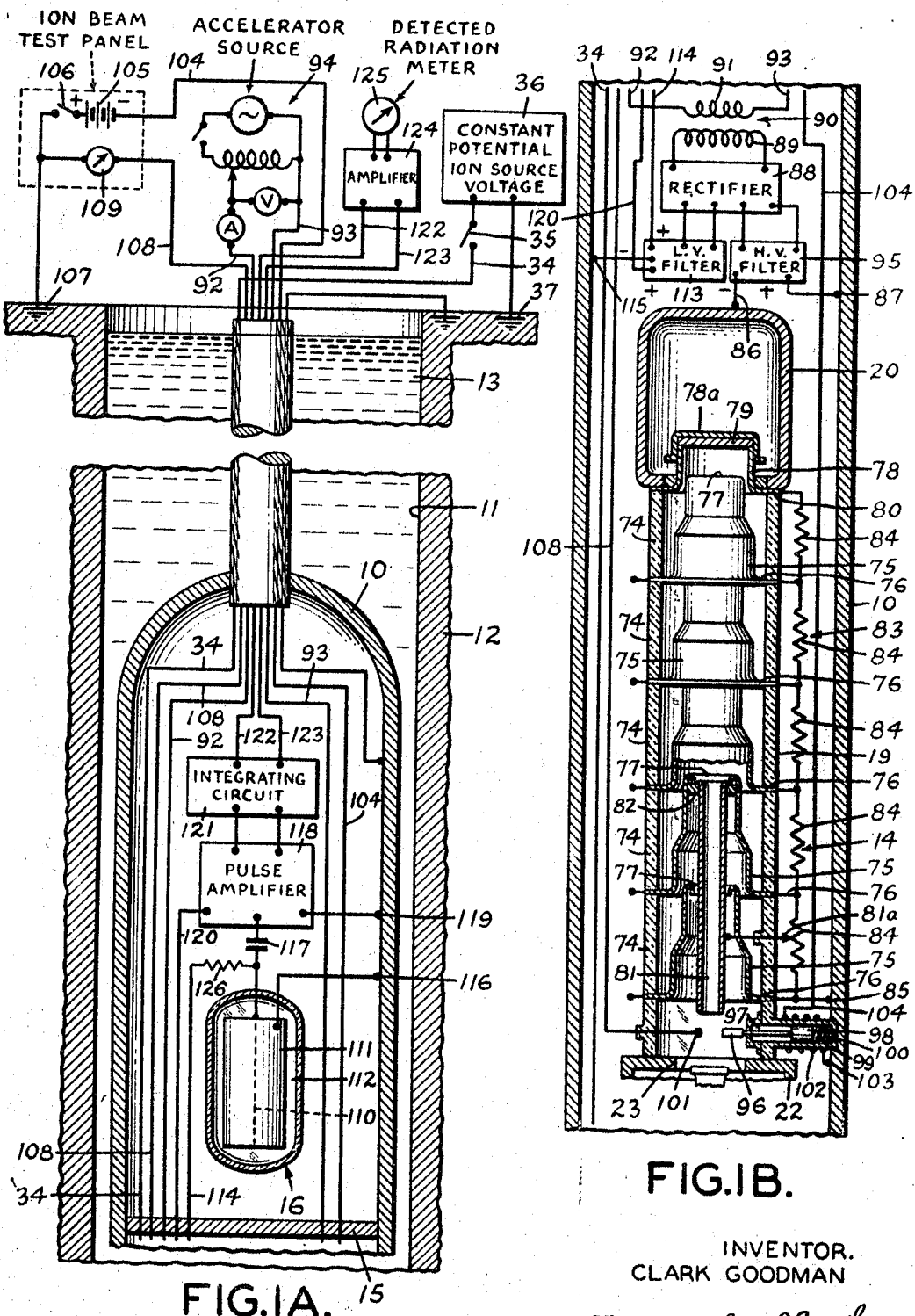

INVENTOR.
CLARK GOODMAN

HIS ATTORNEYS.

Aug. 12, 1969  C. GOODMAN  3,461,291
WELL LOGGING DEVICE USING A PULSED SOURCE OF
MONOENERGETIC NEUTRONS
Original Filed March 11, 1952  3 Sheets-Sheet 3

INVENTOR.
CLARK GOODMAN
BY Campbell, Brumbaugh, Free Graves
HIS ATTORNEYS.

United States Patent Office 3,461,291
Patented Aug. 12, 1969

3,461,291
WELL LOGGING DEVICE USING A PULSED SOURCE OF MONOENERGETIC NEUTRONS
Clark Goodman, Boston, Mass., assignor to Schlumberger Technology Corporation, Houston, Tex., a corporation of Texas
Continuation of application Ser. No. 275,932, Mar. 11, 1952. This application June 22, 1967, Ser. No. 648,170
Int. Cl. G01t *1/18;* H01j *39/26;* E21b *47/00*
U.S. Cl. 250—83.6                                62 Claims

ABSTRACT OF THE DISCLOSURE

A system for radioactivity well logging incorporating a source of high energy monoenergetic neutrons is described. The neutron source is an accelerator tube in which charged particles, e.g. deuterium ions, are accelerated under relatively low voltages toward a target element including tritium. The resulting reaction of the deuterium ions with the tritium target produces monoenergetic neutrons at an energy level of 14 mev. These neutrons bombard the formations surrounding the well bore and induce a radioactive response, in the form of neutrons and gamma radiation, which is detected by a suitable instrument in the logging tool. Operation of the accelerator and the detecting circuitry is controlled completely from the surface and the neutron source may be kept inactive until it reaches the logging depth in the well bore and deactivated prior to its return to the surface, thereby minimizing radiation hazards. At the same time, the surface circuitry for providing the output indications may be controlled so that pulsed neutron bombardment and detection during preselected intervals may be effected. The tool may be used to obtain neutron-neutron or neutron-gamma ray logs separately, or both on a single run with appropriately gated detecting circuits.

---

This application is a continuation of Ser. No. 275,932, filed Mar. 11, 1952, now abandoned.

The present invention relates to neutron well logging and more particularly to novel methods and apparatus utilizing neutrons for investigating earth formations traversed by a well.

The neutron well logging systems currently available, while useful, have not proved to be entirely satisfactory in practice. In a typical method, a source of neutrons comprising, for example, a mixture of radium and beryllium is passed through a well and indications are obtained of nuclear phenomena resulting from the bombardment of the surrounding formations by the neutrons emitted from the source. Sources of this type emit, in addition to neutrons, a relatively large percentage of gamma radiation flux from which the radioactivity detecting apparatus must be shielded. Even with proper shielding, however, difficulty may be encountered in distinguishing the nuclear phenomena caused by the bombarding neutrons from the direct or indirect effects on the detecting apparatus of the gamma radiation flux from the neutron source.

Another disadvantage derives from the fact that the neutrons emitted by a source of the above character are not monoenergetic but are distributed over a relatively broad energy spectrum. Since the radiation received by the radioactivity detecting apparatus is a function of the energies of the neutrons emitted by the source as well as of the composition of the material surrounding the source, it will be understood that logs produced by a system of this kind may be difficult to interpret correctly. Further, the energy level of most of the emitted neutrons is relatively low so that many of them are attenuated by the column of liquid which is usually present in the well, with the result that the surrounding formations may have little effect on the log obtained. In addition, such neutron sources are continuously radioactive and, unless rather elaborate safety precautions are taken, can be a real health hazard to the well logging operators required to handle them prior to insertion in a well.

It is a primary object of the invention, accordingly, to provide novel methods and apparatus for neutron well logging which are free from the above-noted deficiencies of the prior art.

Another object of the invention is to provide a novel source of neutrons for use in neutron well logging operations and the like, which does not emit other types of radiation to any substantial extent.

A further object of the invention is to provide a novel source of high energy, monoenergetic neutrons for use in well logging operations and the like.

Still another object of the invention is to provide a novel neutron source in which the intensity of the neutron emission may be controlled as desired from the surface of the earth while the source is located at any depth in the bore hole.

Another object of the invention is to provide a source of neutrons for well logging or the like which may be readily activated in a bore hole during logging operations and thereafter deactivated prior to withdrawal from a well, thereby eliminating any possible health hazard to personnel at the surface.

These and other objects of the invention are attained by providing neutron well logging apparatus comprising a source of substantially monoenergetic, high energy neutrons adapted to be disposed within the confines of a bore hole drilled into the earth and including means for adjusting the intensity of the neutron emission from the surface of the earth. The source may include, for example, apparatus for generating elementary charged particles, means for accelerating the particles to appropriate energy levels and corresponding velocities, and target means disposed in the path of the accelerated particles and made of a material adapted to emit neutrons when bombarded with charged particles of sufficient velocity.

More specifically, the neutron source according to the invention may comprise means for generating positively charged particles such as deuterons, for example, which, after acceleration to suitable velocities, are caused to impinge upon a target including tritium, for example. In this fashion, a relatively intense emission of monoenergetic neutrons of 14 million electron volts energy can be obtained with deuterons having relatively low energy levels and velocities that are attainable with low voltage accelerating electric fields of say 100 kv. or less. The invention also contemplates the provision of means for controlling from the surface of the earth the intensity of the neutron emission in the bore hole.

According to another embodiment of the invention, means are provided for modulating the beam of deutrons to cause the neutron emission to be interrupted or reduced periodically, one or more properly phased radioactivity detectors being employed for obtaining indications of nuclear phenomena only while the neutron emission is interrupted or reduced.

It will be readily apparent that the novel neutron well logging apparatus of the invention will afford far higher intensities of neutron emission than are attainable with the sources employed heretofore. Accordingly, it will make possible the identification of many substances which could not be located with the logging systems used previously in which neither the energy levels nor the intensities of the neutrons emitted were high enough to excite these substances. Further, since the intensity of the neutron emission is adjustable, a log can be obtained for a specific value of intensity or several logs can be run at different intensities for purposes of comparison.

High energy level neutrons of the type utilized in the invention have a number of desirable properties which render them of considerable utility in well logging operations. For one thing, they are subject to a proportionately larger degree of inelastic scattering, particularly in formations containing substances of low atomic weight. The gamma rays which are emitted following inelastic scattering in substances of low atomic weight are substantially higher in energy, on the average, than those following inelastic scattering in heavy elements. Therefore, they are able more readily to penetrate the surrounding formations and the well casing. Hence, logs made with neutron emission of high energy level are effective in locating formations containing substances of low atomic weight and are characterized by a greater effective radius of investigation.

Other nuclear properties of materials change markedly as the energy level of the bombarding neutrons is increased. For example, the scattering cross-section of hydrogen decreases sharply as the energy level of the neutrons increases. Accordingly, fewer of the neutrons will be attenuated by the bore hole liquid and more will reach the surrounding formations, so that the logs obtained will be more truly representative of the formations.

For a better understanding of the invention, reference is made to the following detailed description of several typical embodiments, taken in conjunction with the accompanying drawings, in which:

FIGS. 1A, 1B and 1C illustrate schematically the upper, middle and lower portions, respectively, of neutron well logging apparatus constructed according to the invention;

Figure 1C:
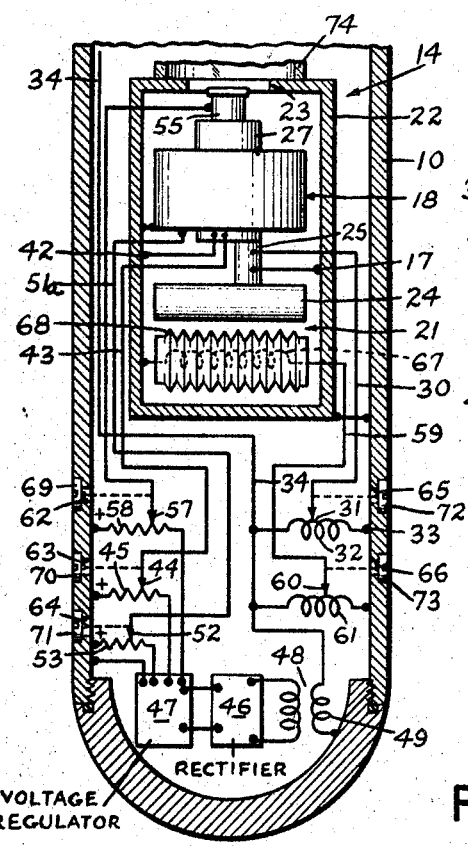

Referring now to FIG. 1A, the neutron well logging apparatus is shown disposed in a bore hole 11 traversing a plurality of earth formations 12. The bore hole 11 usually contains a hydrogenous drilling liquid 13 such as, for example, oil base or water base mud, and it may be lined with one or more strings of metallic casing (not shown) or it may be uncased as illustrated.

The neutron well logging apparatus may comprise a pressure resistant housing 10 containing a source 14 of 14 mev. monoenergetic neutrons (FIGS. 1B and 1C), a radioactivity responsive device 16 for detecting the nuclear phenomena to be observed, and the electronic equipment required for proper operation of the neutron source and the detector, as described in greater detail hereinafter. Beneath the device 16 may be disposed a thin shield 15 which may be of lead when the apparatus is to be used for making neutron-gamma ray logs, and of hydrogenous material such as paraffin when neutron-neutron logs are required. The apparatus is adapted to be moved through the bore hole 11 by means of the usual supporting cable and winch apparatus (not shown) located at the surface of the earth.

The neutron source 14 (FIGS. 1B and 1C) is a self-contained, evacuated system mounted in the pressure resistant housing 10 and it may comprise, for example, an ion particle source 18 including suitable getter apparatus 21 for absorbing any gas generated in the system, a particle accelerator tube 19, and a target chamber 20.

The ion source 18 is contained within an enclosed chamber 22 having a port 23 formed in the upper wall thereof which communicates with the accelerator tube 19. In general, it includes a controllable source of a suitable gas such as deuterium, for example, under pressure, means for ionizing the gas to produce positive ions and means for directing the ions to the accelerator tube 19. The deuterium gas may be carried in a small tank 24 mounted within the chamber 22 and it is adapted to be fed through a conduit 25 (FIG. 2) to a port 26 in a substantially cylindrical, enclosed ion chamber 27.

The rate of flow of the gas is preferably controlled by adjusting the current supplied to a heater coil 28 associated with a conventional palladium plug 29 which extends into the conduit 25, in the well known manner. To this end, one terminal of the coil 28 may be grounded to the chamber 22 at 17, and its other terminal may be connected by a conductor 30 to an adjustable contact 31 on an autotransformer 32. One terminal of the autotransformer 32 may be grounded to the housing 10 at 33 and its other terminal may be connected to a conductor 34 extending to the surface of the earth and in series with a switch 35 (FIG. 1A) to one terminal of a suitable constant potential AC source 36, the other terminal of which may be grounded to the earth at 37.

Figure 2:
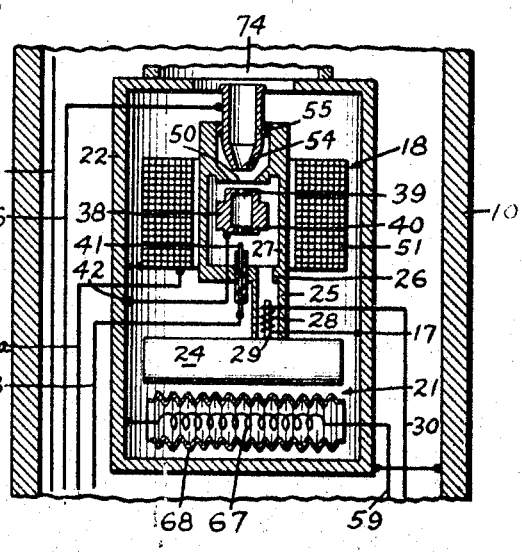
FIG. 2 is an enlarged schematic view in longitudinal section of the ion source employed in the apparatus of FIGS. 1A, 1B and 1C.

As shown in greater detail in FIG. 2, the ion chamber 27 houses a substantially annular arc electrode 38 having upper and lower ports 39 and 40 formed therein. In the vicinity of the port 40 in the electrode 38 is disposed a second arc electrode 41. When an appropriate arcing potential is applied between the electrodes 38 and 41, an arc is established which causes the deuterium leaking into the ion chamber 27 from the tank 24 to be ionized into positively charged deuterium ions or deuterons. The arcing potential may be established in any suitable manner an by grounding the electrode 38 to the body of the chamber 22 at 42 and connecting the electrode 41 by a conductor 43 to an adjustable slider 44 on a potentiometer 45 (FIG. 1C). The potentiometer 45 may be energized by DC from a conventional rectifier 46 through a suitable voltage regulator 47, and its positive terminal is preferably grounded to the housing 10, as shown. The rectifier may receive AC from a transformer 48, the primary winding 49 of which has one terminal grounded to the housing 10 as shown and another terminal connector to be conductor 34 which leads to the source 36 at the surface (FIG. 1A).

Ionization of the deuterium gas by the arc between the electrodes 38 and 41 is increased in intensity and confined near the axis of the ion chamber 27 by means of an axial magnetic field of adjustable intensity which may be produced by a solenoid 51. Energization for the solenoid 51 may be provided by grounding one terminal thereof to the chamber 22 and connecting the other terminal by a conductor 51a to the slider 52 of a conventional potentiometer 53 (FIG. 1C). The potentiometer 53 may be energized by DC from the voltage regulator 47 and its positive terminal is preferably grounded to the housing 10.

With reference to FIG. 2, the ions are withdrawn from the ion chamber 27 into a substantially cylindrical opening 54 formed in a conducting probe 55 maintained at a slightly negative potential with respect to the ion chamber 27 which may be grounded. To this end, the probe 55 may be connected by a conductor 56 to the slider 57 of a potentiometer 58 energized from the output of the voltage regulator 47 and having its positive terminal grounded to the housing 10 (FIG. 1C). The probe 55 tends to draw the positive ions out of the ion chamber 27 into the accelerating tube 19 which serves to accelerate the deuterium ions to desired energy levels.

Ideally, the enclosed system comprising the chamber 22, the accelerating tube 19 and the target container 20 should be completely evacuated in order to prevent any slowing down of deuterons by gas molecules. However, because deuterium gas is continuously being introduced into the system from the source of gas 24 (FIG. 1C), the ideal can only be approximated and a suitable operating pressure may be, for example, $10^{-4}$ cf. of mercury, conventional getter means 21 being provided for absorbing the ionized hydrogen gas developed. Such means may include, for example, a corrugated tube 68 of out-gassed zirconium, titanium or uranium heated by a filament 67. Energization of the filament 67 may be effected by grounding one terminal to the chamber 22 and connecting the other terminal by a conductor 59 to the slider 60 of an autotransformer 61, one terminal of which is grounded to the housing 10 and the other terminal of which is connected to the conductor 34 leading to the source 36 at the surface. All of the elements in the vacuum system should be carefully out-gassed; as a further precaution, other getter materials capable of absorbing other gasses may be provided in the chamber 22, in addition to hydrogen getters. The grounded chambers 22 and 27 shield the gas ionizing and getter elements from the electric fields generated by the high potentials impressed on the tube electrodes 75.

As described in greater detail below, one or more of the sliders 57, 44, 52, 31 and 60 may require adjustment in order to establish a desired ion current and it is preferred to make these adjustments with the neutron logging apparatus at the surface of the earth. To facilitate the making of these adjustments, a plurality of access ports 62, 63, 64, 65 and 66 may be formed in the housing 10 (FIG. 1C) which may be closed by removable watertight plugs 69, 70, 71, 72 and 73, respectively.

Figure 3:
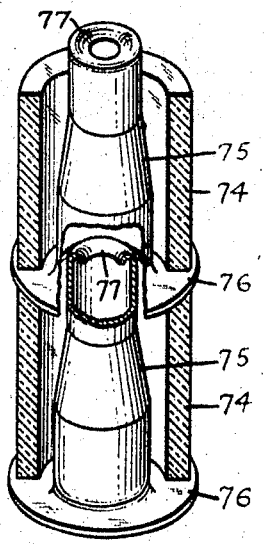
FIG. 3 is a perspective view, partly in section, of a portion of the particle accelerator means in the apparatus of FIGS. 1A, 1B and 1C.

As shown in FIGS. 1B and 3 the accelerator tube 19 may comprise a plurality of annular sections 74 of equal length constructed of suitable insulating material such as out-gassed glass and superimposed on one another so as to form a cylindrical tube, as shown. Interposed between each adjacent pair of sections 74 is a conductive, funnel-shaped tube electrode 75 having a radially extending flange 76 formed at the lower end and having an inwardly curved bead 77 formed at the other end thereof. The sections 74 may be secured to opposite sides of the flanges 76 by suitable means, such as cement, for example, so as to form a gas-tight seal.

The uppermost section 74 is closed by the target chamber 20 which may also be formed of metal and which may be cemented to the topmost section 74 of the accelerator tube 19. Disposed within the target chamber 20 is an open-ended, cylindrical conducting member 78 on which is supported a cup-shaped member 78a carrying a target plate 79. The cylindrical member 78 is provided with a radially extending flange 80 which extends between the adjacent edges of the target chamber 20 and the uppermost section 74 of the accelerator tube 19 and which provides an electrical connection to the exterior. The target plate 79 may comprise, for example, a tungsten disc 2 cm. in diameter and 0.025 inch thick, coated with .002 inch of zirconium containing 2 to 3 cc. of tritium gas. If desired, a focussing electrode 81 may be disposed within the two lowermost accelerating tubes 74 and it may be insulated from the tube electrodes 75 therein by a ring 82 made of suitable insulating material.

The tube electrodes 75, the conducting member 78 and the electrodes 55 and 81 are preferably made of outgassed getter material such as titanium, zirconium or uranium, for example, which will absorb deuterium gas at the elevated temperatures encountered in bore holes and thus assist in maintaining the requisite low pressure in the evacuated system.

The tube electrodes 75 in the accelerator tube 19 are adapted to be maintained at successively more negative potentials by suitable means such as a voltage divider 83 comprising a plurality of identical resistors 84 connected between adjacent tube electrode flanges 76, as shown. The flange 76 on the lowermost tube electrode 75 may be grounded to the pressure resistant housing 10 at the point 85 and the conductive chamber 20 may be connected by a conductor 86 to the negative terminal of a suitable source of high voltage DC, the positive terminal of which is grounded to the pressure resistant housing 10 at the point 87. The focussing electrode 81 should preferably be maintained at a potential intermediate the potentials of the two lowermost tube electrodes 75. To this end, it may be connected to a slider 81a on the lowermost resistor 84, as shown.

The high voltage DC power supply for the accelerator tube 19 should be capable of furnishing an adjustable voltage from zero to 100 kv. and it may comprise, for example, a conventional rectifier 88 energized from the secondary winding 89 of a transformer 90, the primary winding 91 of which may be connected by conductors 92 and 93 in the supporting cable to an adjustable source of AC 94 located at the surface of the earth. Desirably, the high voltage output of the rectifier 88 should be filtered by a conventional filter 95, the output of which is impressed between the ground point 87 and the conductor 86.

Preferably, means is provided for indicating at the surface of the earth whether the ion beam is functioning properly. Suitable means for this purpose may comprise a thin metallic plate 96 disposed perpendicularly to the beam path and mounted on an actuator member 97 carried by a slider 98. The slider 98 is adapted to slide in a bore 99 formed in the side wall of the lowermost accelerator tube section 74. Between the slider 98 and the wall of the bore 99 is a compression spring 100 which is adapted to urge the plate 96 into engagement with a contact 101 mounted in the opposite wall of the lowermost section 74. Normally, the slider 98 is maintained in retracted position by means, such as a magnetic solenoid 102. One terminal of the solenoid 102 may be grounded to the housing 10 at 103 and its other terminal may be connected by a conductor 104 in series with a source of electrical energy 105 and a switch 106 to a ground 107 at the earth's surface (FIG. 1A). The electrode 101 (FIG. 1B) is connected by a conductor 108 to a current indicating instrument 109 at the surface, the other terminal of which may be connected to the ground 107.

It will be understood that while the switch 106 is closed (FIG. 1A) and the solenoid 102 (FIG. 1B) is energized, the plate 96 will be maintained out of the path of the ion beam in the position shown, so that there will be no reading on the meter 109 (FIG. 1A). To test the condition of the ion beam, the switch 106 is opened to permit the plate to interrupt the beam path and engage the electrode 101 (FIG. 1B). The reading of the meter 109 (FIG. 1A) will then indicate the condition of the ion beam. Also, while the plate 96 lies in the path of the ion beam, there will be no neutron emission from the target 79, so that the neutron emission can be turned on and off merely by proper manipulation of the switch 106.

The form of the radioactivity detector will depend on the nature of the particular well logging process in which the apparatus is to be used, as will appear below. In FIG. 1A the radioactivity detector 16 is shown schematically as a Geiger-Muller tube having a central anode wire 110 surrounded by a cylindrical cathode 111 in an envelope 112 containing gas at a suitable pressure, as known in the art. Positive voltage may be supplied to the anode 110 from the rectifier 88 through a conventional low voltage filter 113 and a conductor 114, the negative output terminal of the filter 113 and the cathode 111 of the tube 16 being grounded to the housing 10 at the points 115 and 116, respectively. The pulse output from the anode 110 of the tube 16 may be fed through a condenser 117 to one input terminal of a conventional pulse amplifier 118, the other input terminal of which may be grounded to the housing 10 at 119. The amplifier 118 may be energized by power received from the output of the filter 113 (FIG. 1B) through a conductor 120.

The pulse output from the amplifier 118 may be supplied to a conventional integrating circuit 121 (FIG. 1A) the output of which is transmitted through the conductors 122 and 123 to conventional amplifier means 124 at the surface which supplies an output to a measuring instrument 125, preferably of the type capable of recording the output as a function of the depth of the well logging apparatus in the bore hole. Desirably, a resistor 126 should be placed in series with the conductor 114 to keep the pulse output from the tube 16 out of the voltage supply for the anode 110, and to assist in quenching the tube 16.

In view of the high voltages involved, the interior of the housing 10 is preferably filled with a suitable insulating gas such as nitrogen at a pressure of say 30 atmospheres or with insulating liquid such as transformer oil, for example.

It will be observed that the target plate 79 is maintained at a high negative potential instead of at ground potential, the latter now being the accepted practice in apparatus of this general character. This feature is highly advantageous since it enables the ion source and ancillary equipment to be maintained at a relatively low potential. In this way, only nominal electrical insulation is required for those parts of the device requiring adjustment. In the limited confines of apparatus adapted to pass through a bore hole, high voltage electrical insulation is difficult to accomplish, except at the target which requires no adjustment. Further, since the ion source is maintained at a relatively low potential, adjustment can be made thereon by an operator with relative safety and without elaborate safety precautions.

The grounded chambers 22 and 27 shield the gas ionizing and getter elements from the electric fields generated by the high potentials impressed on the tube electrodes 75.

In order to put the well logging apparatus in proper condition for well logging operations, a number of adjustments must be made while the apparatus is at the surface of the earth. These adjustments are effected with the switch 106 (FIG. 1A) opened so that the plate 96 (FIG. 1B) is in the ion beam path and in engagement with the electrode 101. Under these conditions, the ion beam when formed is prevented from reaching the target 79, so that there can be no emission of neutrons and no possible health hazard to the operators handling the apparatus at the surface.

The switch 35 is closed to connect the constant potential source 36 to the conductor 34, thereby supplying voltage to the autotransformers 32 and 61 (FIG. 1C) and to the primary winding 49 of the transfer 48. The accelerator voltage source 94 (FIG. 1A) is also adjusted to a suitable value to supply power to the rectifier 88 (FIG. 1B), thus energizing the plates 75 in the accelerator tube 19, the Geiger-Muller tube 16 and the pulse amplifier 118. Also, the plugs 69, 70, 71, 72 and 73 (FIG. 1C) are removed and the sliders 57, 44, 52, 31 and 60 adjusted until a satisfactory ion beam has been established, as indicated by the reading of the instrument 109 (FIG. 1A). The plugs 69, 70, 71, 72 and 73 are then replaced whereupon the pressure resistant housing 10 is lowered into the bore hole 11.

As soon as the housing 10 has been lowered a sufficient distance to afford ample protection to the operators, or when the depth at which the logging operation is to begin is reached, the switch 106 (FIG. 1A) is closed, energizing the solenoid 102 and causing the plate 96 to be moved out of the ion beam path and out of engagement with the electrode 101. This causes a sudden change in the reading of the instrument 109 which serves as an indication that the ion beam is now reaching the target 79 and that 14 mev. energy level neutrons are being emitted. The intensity of the neutron emission can be adjusted from the surface by adjusting the magnitude of the voltage supplied by the source 94 (FIG. 1A). The apparatus is then ready for a logging run in the well.

If a neutron-gamma ray log is desired, a detector 16 (FIG. 1A) is used which is responsive to gamma rays and indications are obtained therefrom which are a function of both the inelastic scattering of the high energy neutrons and of the radioactive capture of slow neutrons by formation material. Since hydrogen has a decreased scattering cross-section to 14 mev. neutrons, a relatively large percentage of the neutron flux from the source 14 will pass through the hydrogenous drilling liquid 13 (FIG. 1A) and will penetrate the formations. Accordingly, the response of the radioactivity detector 16 (FIG. 1A) will be more truly representative of the gamma radiation resulting from the formation material. Further, since monoenergetic neutrons are used to bombard the formations the logs obtained may be quite readily interpreted.

In addition, the increased effective penetration of radiation made possible by the decreased scattering cross-section of hydrogen will result in inelastic and capture gamma radiation reaching the radioactivity detector 16 from formation material located at a greater distance from the detector than is possible with conventional neutron sources of the radium-beryllium type. As stated, neutron sources constructed according to the invention are characterized by a relatively low percentage of gamma ray flux emission so that the indications obtained are to a larger degree representative of the neutron reactions on formation material, and heavy extensive shielding between the source and the detector is not necessary.

When a neutron-neutron log is desired, the detector apparatus 16 is made responsive primarily to neutrons of a predetermined energy range, as several different ranges are of particular interest. For example, if the detector 16 is a counter or ionization chamber lined with boron or filled with the gas $BF_3$, the log obtained will be representative primarily of the flux of low energy neutrons (less than about 100 ev.), at the detector and will give valuable information regarding the absorption properties of the formations. On the other hand, if the detector 16 is a counter or ionization chamber filled with a gas such as nitrogen, for example, the log obtained will be a function primarily of the flux of intermediate energy neutrons (100 ev.–1 mev.) and will be indicative of the elastic scattering of the neutrons in the formations. Lastly, if the counter or ionization chamber is lined with a suitable neutron threshold detecting material such as $U^{238}$ or $Th^{232}$, for example, its response will be a function primarily of the inelastic scattering properties of the formations with respect to neutrons. Separate neutron-neutron logs of these three types were heretofore impossible of attainment but now are made possible with the high intensity, high energy monoenergetic neutrons provided according to the invention.

If desired, a plurality of appropriate radioactivity detectors may be placed in the housing 10 to enable any two or more of the four types of neutron logs discussed above (i.e., the neutron-gamma ray log and the three different neutron-neutron logs) to be obtained simultaneously.

With the high energy levels and intensities of neutron emission now made available in accordance with the invention, it is possible to cause various elements in the formations to become artificially radioactive. By making one or more radioactivity logs at definite predetermined time intervals subsequently to the passing of the neutron source through the bore hole, the rate of decay of the induced radioactivity may be determined, thus affording indications of the nature of the material in the formations traversed by the bore hole.

Figure 4:
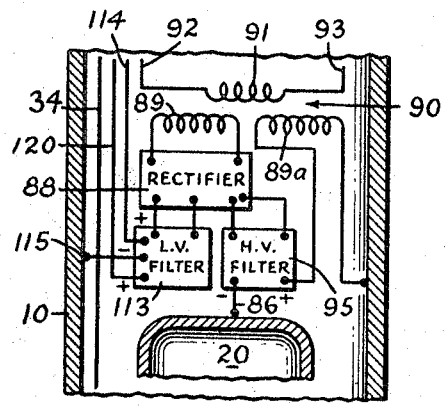
FIG. 4 illustrates schematically a modification of the high voltage supply shown in FIG. 1B for modulating the neutron emission from the source.

By way of illustration, the source of neutrons may be periodically modulated in intensity or turned completely off and on, radioactive phenomena produced by neutron bombardment of the formations being detected at predetermined intervals after activation of the source and while the emission therefrom is being interrupted, for the purpose of determining rates of decay of such radioactive phenomena. Modulation of the ion beam intensity might be accomplished, for example, by connecting a suitable source of AC voltage in series with the conductor 86, as shown in FIG. 4. The AC modulating voltage may be derived from another secondary winding 89a on the transformer 90 which is connected between the positive terminal of the filter 95 and the ground 87, as shown. If a negative DC potential of say 60 kv. is applied to the target chamber 20 and an AC voltage of say 40 kv. peak value is supplied by the secondary winding 89a, the ion beam will be modulated between 20 kv. and 100 kv. negative. Under these conditions, the intensity of the neutron emission will vary periodically from a maximum value to a minimum value in accordance with the modulation voltage. Most of the neutrons will be produced during relatively small intervals of time when the sinusoidal voltage is near its peak negative values.

The detector apparatus, which may be designed for detection of either neutrons or gamma rays may be connected by the conductors 122 and 123 (FIG. 5) to one pair of input terminals of each of a plurality of gated amplifiers 127, 128 and 129 having indicating instruments 130, 131 and 132, respectively, connected to the output terminals thereof. The amplifiers 127, 128 and 129 are normally inoperative but are adapted to become operative upon receipt of gating signals of proper magnitude and polarity. Suitable gating signals may be provided by a pulse generator 133 which receives synchronizing signals from the source 94 through a transformer 134 and suitable phase adjusting means such as an adjustable condenser 135, for example. The output of the pulse generator 133 is fed directly to the amplifier 129 and through conventional time delay circuits 136 and 137 to the amplifiers 128 and 127, respectively.

By way of example, the condenser 135 and the delay circuits 136 and 137 may be adjusted to provide gating signals to render the amplifiers operative at three different time intervals after each peak value of neutron emission from the source and while emission from the latter is reduced. In this manner, the rate of decay of the material in the formations may be accurately determined.

Figure 4A:
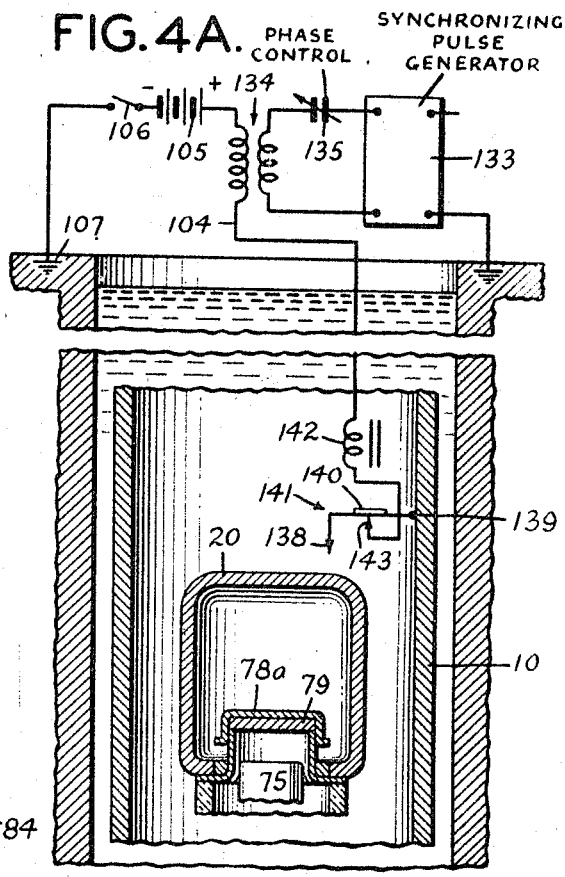
FIGS. 4A, 4B and 4C illustrate schematically other ways in which the neutron emission may be modulated or periodically interrupted.
Figure 4B:
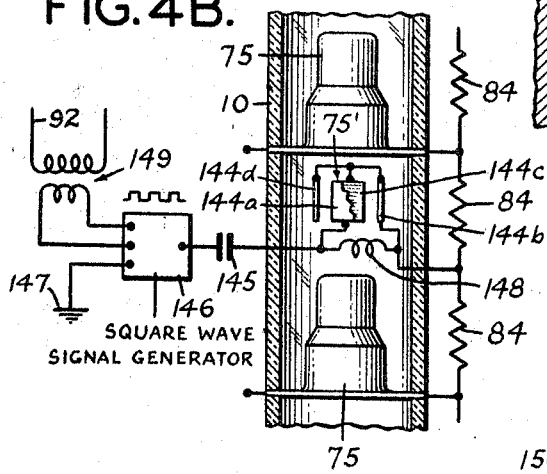
Figure 4C:
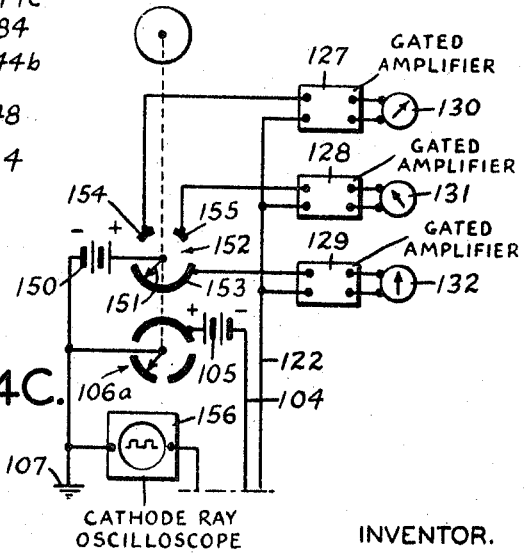

Other illustrative ways of modulating the ion beam are shown in FIGS. 4A, 4B and 4C. In FIG. 4A, the potential applied to the target chamber 20 and to the target 79 is adapted to be corona controlled by one or more pointed elements 138 grounded at 139 to the housing 10 which are adapted to be moved periodically towards and away from the target chamber 20. The pointed element or elements 138 may be mounted on the armature 140 of a conventional electromagnetic vibrator 141 having a magnetizing coil 142. The coil 142 may be energized by connecting one terminal to the vibrator fixed contact 143 and the other terminal to the conductor 104 which leads to the source of electrical energy 105 (FIG. 1A) at the surface of the earth. The surface equipment may be substantially as shown in FIG. 5 except that the primary winding of the transformer 134 should be connected in series with the conductor 104 so as to synchronize the pulse generator 133 with the vibrator 141, as shown in FIG. 4A.

The armature 140 of the vibrator 141 may be biased to maintain the pointed element or elements 138 close enough to the target chamber 20 to cause a corona discharge, thereby reducing the negative voltage applied to the target chamber 20 to a low value. When the armature 140 is pulled away from the target chamber 20, the corona discharge ceases and the voltage applied to the target chamber 20 rises to its maximum value. In this way, the voltage is periodically modulated between maximum and minimum values, causing a corresponding modulation of the neutron flux emission.

Figure 5:
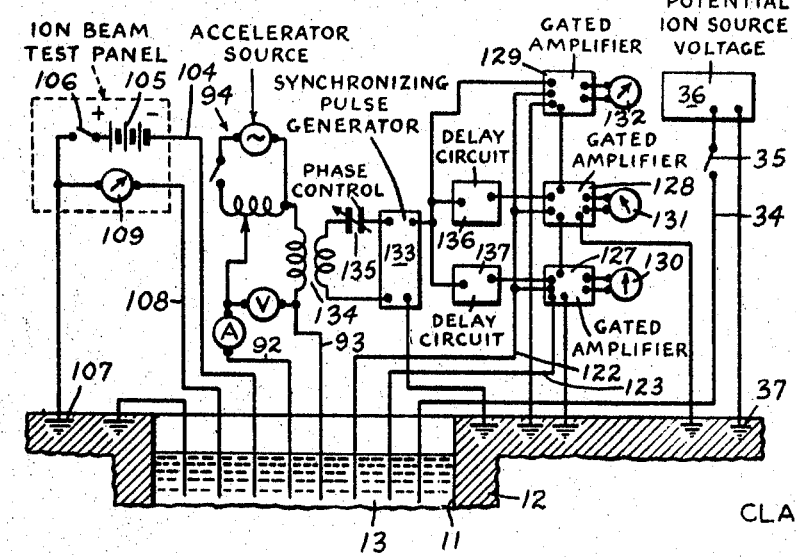
FIG. 5 is a schematic diagram illustrating modified surface equipment for use when the neutron emission intensity is modulated as by the means shown in FIG. 4.

As in FIG. 5, values of radioactive phenomena occurring at different time intervals after each peak value of neutron emission are recorded.

FIG. 4B illustrates a modified form of beam modulating system in which deflecting means are employed for periodically sweeping the beam on and off the target. The beam deflecting means may comprise, for example, opposite pairs of conventional deflecting plates 144a, 144b, 144c and 144d disposed between two adjacent tube electrodes 75, electrically connected together and to the junction point between two of the resistors 84 so that they aid in accelerating the ions in the beam. The ion beam may be deflected off the target plate 79 by applying to one of the deflecting plates a potential of appropriate magnitude and polarity. Thus, the electrode 144a may be connected through a DC blocking condenser 145 to one terminal of a conventional square wave signal generator 146 disposed either in the housing 10 or at the surface of the earth, the other terminal of the generator 146 being grounded at 147 as shown. A choke coil 148 is connected between the plates 144a and 144b to insure that the deflecting potential from the generator 146 will be applied only to the deflecting plate 144a and will not materially change the potential of the plates 144b, 144c, and 144d.

Preferably, the signal generator 146 should be synchronized with the pulse generator 133 (FIG. 5) and to this end it may receive a synchronizing voltage from a transformer 149 having a primary winding connected in series with the conductor 93 which leads to the source 94 at the surface of the earth. In this embodiment, the surface equipment may be the same as that shown in FIG. 5.

It will be understood that suitably energized magnetic coils disposed on opposite sides of the ion beam may be similarly employed for periodically sweeping the beam on and off the target.

Modulation of the ion beam intensity preferably may be employed in those cases where the anticipated induced radioactivity is of very short half-life (i.e., less than one second). Where the expected half-life of the induced radioactivity is longer than about one second, on and off type operation of the ion beam may be used. In such case, the ion beam may be periodically interrupted by substituting for the switch 106 (FIG. 5) a conventional motor driven on-off switch 106a (FIG. 4C) having a period of say one second, and providing suitable means for supplying appropriate gating signals to the amplifiers 127, 128 and 129 (FIG. 5) so as to render the latter operative only at different times during the periods of interruption of the neutron emission.

The gating signals may be provided by a suitable source of voltage 150 having one terminal connected to the ground 107 at the surface and another terminal connected to the rotatable contact 151 on a conventional commutating switch 152. The rotatable contact 151 may be mounted on the same shaft as the movable contact of the switch 106a for rotation in synchronism therewith and it is adapted to engage successively a plurality of fixed contacts 153, 154 and 155. The contacts 153, 154 and 155 are connected as shown to provide gating pulses to the amplifiers 129, 127 and 128, respectively. The switches 106a and 152 may be so phased, for example, that when they are in the positions shown in FIG. 4C, the target is being bombarded by neutrons while gating voltage is being applied to the amplifier 129 so that the instrument 132 will record a non-delayed neutron-neutron or neutron-gamma ray log. For the next half second the plate 96 (FIG. 1B) interrupts the ion beam so that there is no neutron emission, and the instruments 130 and 131 record delayed logs during the next two quarter second intervals, respectively. The on-off beam current may conveniently be observed by a conventional oscilloscope 156 connected to the conductor 108 and to the ground 107.

In all of the above-described techniques utilizing interrupted or modulated neutron emission, it is assumed, of course, that the frequency of the modulation or interruption of the ion beam is fast enough, and/or the logging speed is slow enough to insure that the several arrangements made during each period of interruption of the beam or reduction in its intensity are taken at substantially the same depth in the well.

If the logging speed is known, the half-life of the induced activity can also be readily determined by passing a neutron source and two or more similar detectors through the drill hole with fixed, known vertical spacings therebetween, the detectors lagging behind the neutron source during a run. Where this is done, neither modulation or interruption of the beam nor phasing of the detectors is required but both the neutron source and the detectors may be continuously in operation during a run in a well.

In a number of cases the half-life is diagnostic of a particular element in the formation and hence can be used to ascertain the composition of the sedimentary rock. Furthermore, certain elements are made radioactive by inelastic scattering of fast neutrons, a radioactive isomeric state of the stable element being formed. By calibrating the apparatus in simulated or actual drill holes of known composition, it is possible to obtain quantitative information regarding the concentration of the element in the formation.

In those instances when a very short spacing, say less than three inches, is desired between the neutron source and the detector, the detector 16 could be placed between the filters 95 and 113 (FIG. 1B) and the target container 20. Neutron logs made with a relatively long spacing between the neutron source and the detector are radically different from logs obtained with a relatively short spacing. If desired, a plurality of detectors may be employed having relatively short and relatively long spacings, respectively, from the neutron source.

Before (or after) each run in a well, the gas supply 24 (FIG. 1C) may be turned off and the getter apparatus 21 operated to deplete the accelerating apparatus of any accumulated gas. In this way, reevacuation of the system is made unnecessary over long periods of time.

In practice, the accelerator tube 19 may be from 10 to 15 inches in length, each of the sections 74 being from 2 to 3 inches in length. The ion beam need not be sharply focused but may cover from one to two square centimeters of target area. In bore hole applications, sharp focussing of the beam is undesirable since it would rapidly deplete the tritium target unless special cooling means were provided therefor. With a beam current of say 20 microamperes and accelerating voltages of say 50 to 100 kv. the 14 mev. neutron yield would range from $10^8$ to $8 \times 10^8$ neutrons per second, corresponding to about 7 to 50 curies of radium-beryllium equivalence. The ion source would use on the order of 2 mg./hr. of deuterium so that there would be no problem of depleting the tank 24 (FIG. 1C).

The invention thus provides novel and highly effective methods and apparatus for making radioactivity logs in wells traversed by a bore hole. By utilizing monoenergetic neutrons of adjustable and relatively high intensity, logs are obtainable which can be interpreted with much greater facility than has been possible heretofore. Further, the use of monoenergetic high energy neutrons minimizes the effect of the hydrogeneous drilling liquid usually present in the bore hole and enables greater depths of investigation to be achieved.

In the apparatus described above, the reaction resulting from deuteron particles bombarding a tritium-bearing target is preferred because this reaction provides high energy neutrons for use in novel logging methods and because the particles require only relatively low accelerating potentials which is desirable in equipment designed to pass through the narrow confines of a bore hole. It will be understood, however, that other reactions producing neutrons may be employed. For example, deuteron particles bombarding a deuterium-bearing target will produce substantially monoenergetic neutrons at approximately 2.5 mev. At low accelerating potentials, say 100 kv., the intensity of neutron flux may be relatively low unless high particle beam intensities are employed.

The specific embodiments described above and illustrated in the drawings are obviously susceptible of modification within the spirit of the invention. For example, the solenoid 51 (FIG. 2) might be a permanent magnet and other forms of electrical energy sources, controls and indicating means might be employed instead of those suggested herein. Those embodiments, therefore, are intended to be merely illustrative and not to restrict the scope of the following claims.

I claim:

1. In a method for investigating earth formations traversed by a bore hole, the steps of emitting substantially monoenergetic neutrons in the bore hole to bombard the formations with the neutrons and obtaining indications of gamma rays resulting from the bombardment of the surrounding formations by the emitted neutrons.

2. In a method for investigating earth formations traversed by a bore hole, the steps of emitting substantially monoenergetic neutrons of given intensity in the bore hole to bombard the formations with the neutrons, changing the intensity of said neutrons, and thereafter obtaining indications of nuclear phenomena excited by the bombardment of the surrounding formations by said neutrons of given intensity.

3. In a method of investigating earth formations traversed by a bore hole, the steps of emitting a high intensity flux of substantially monoenergetic, high energy neutrons in the bore hole to bombard the formations with the neutrons and obtaining indications of gamma rays that are representative of the radioactive capture of slow neutrons by formation material.

4. In a method of investigating earth formations traversed by a bore hole, the steps of emitting a high intensity flux of substantially monoenergetic, high energy neutrons in the bore hole to bombard the formations with the neutrons, interrupting said neutron flux emission, and obtaining indications of nuclear phenomena appearing in the vicinity of the portion of the bore hole subjected to said neutron flux emission during the period of interruption of said neutron flux emission.

5. In a method of investigating earth formations traversed by a bore hole, the steps of emitting a high intensity flux of substantially monoenergetic, high energy neutrons in the bore hole to bombard the formations with the neutrons, interrupting said neutron flux emission, and obtaining indications of nuclear phenomena appearing in the vicinity of the portion of the borehole subjected to said neutron flux emission at a plurality of different times during the period of interruption of said neutron flux emission.

6. In a method of investigating earth formations traversed by a bore hole, the steps of emitting a high intensity flux of substantially monoenergetic, high energy neutrons in the bore hole to bombard the formations with the neutrons, and simultaneously obtaining indications at a plurality of different locations in the bore hole, longitudinally spaced from each other and from the location where said neutron flux is emitted, of nuclear phenomena appearing in the vicinity of said location following said neutron flux emission.

7. In neutron well logging apparatus, the combination of a pressure resistant housing adapted to be lowered into a well, a source of charged particles in the housing, means providing a directed beam of the charged particles, and target means in the housing and in the path of said beam, said beam providing means including a source of relatively low voltage DC having a negative terminal connected to said target means and a positive terminal connected said charged particle source and grounded to said housing, said target means including means responsive to charged particles impinging thereon for emitting a high intensity flux of substantially monoenergetic, high energy neutrons.

8. In neutron well logging apparatus, the combination of a pressure resistant housing adapted to be lowered into a well, means providing a directed beam of charged particles, target means in the housing and in the path of said beam, said target means including means responsive to charged particles impinging thereon for emitting a high intensity flux of substantially monoenergetic, high energy neutrons, and means for modifying said beam of charged particles so as to produce a corresponding modification in the intensity of the neutron flux emission.

9. In neutron well logging apparatus, the combination of a pressure resistant housing adapted to be lowered into a well, means providing a directed beam of charged particles, target means in the housing and in the path of said beam, said target means including means responsive to charged particles impinging thereon for emitting a high intensity flux of substantially monoenergetic, high energy neutrons, and means controllable from the surface of the earth for selectively permitting or preventing impingement of the charged particles in said beam upon said target means.

10. In neutron well logging apparatus, the combination of a pressure resistant housing adapted to be lowered into a well, an evacuated envelope in said housing containing a source of charged particles, electric field establishing means for accelerating said charged particles in a beam, and target means disposed to receive said particles and adapted to provide an emission of neutron flux upon impingement of said particles thereon, means normally out of said beam path but movable into said beam path to interrupt the beam, and means operable at the surface of the earth for controlling the position of said beam interrupting means.

11. The combination defined in claim 10 together with an electrical indicating circuit including an electrode in said envelope engageable by said beam interrupting means when in the beam interrupting position, and electrical indicating means at the surface of the earth cooperating with said electrode and said beam interrupting means to indicate the position of said beam interrupting means.

12. In neutron well logging apparatus, the combination of a pressure resistant housing adapted to be lowered into a well, an evacuated envelope in said housing containing a source of charged particles, electric field establishing means in said envelope for accelerating said charged particles in a beam, target means disposed to receive said accelerated particles and adapted to provide an emission of neutron flux upon impingement of said particles thereon, and means controllable from the surface of the earth for adjusting the electrical condition of said field establishing means to modify said emission of neutron flux.

13. In neutron well logging apparatus, the combination of a pressure resistant housing adapted to be lowered into a well, an evacuated envelope in said housing containing a source of charged particles, electric field establishing means in said envelope for accelerating said charged particles in a beam, target means disposed to receive said accelerated particles and adapted to provide an emission of neutron flux upon impingement of said particles thereon, and means for periodically modifying the electrical condition of said field establishing means to produce corresponding modifications in said neutron flux emission.

14. In neutron well logging apparatus, the combination of a pressure resistant housing adapted to be lowered into a well, an evacuated envelope in said housing, means for introducing gas into said envelope at a controlled rate, means for ionizing said gas to form positively charged particles, electric field establishing means in said envelope for accelerating said charged particles in a beam, and target means in said envelope disposed to receive said accelerated particles and adapted to emit neutrons upon impingement of said particles thereon.

15. The combination defined in claim 14 together with getter means in said envelope for degassing the same.

16. In neutron well logging apparatus, the combination of a pressure resistant housing adapted to be lowered into a well, an evacuated envelope in said housing, means for introducing deuterium gas into said envelope at a controlled rate, means for ionizing said gas to form positively charged deuterons, electric field establishing means in said envelope for accelerating said deutrons in a beam, and target means in said envelope disposed in the path of said beam and containing tritium whereby an emission of neutrons of 14 mev. energy level is produced upon impingement of said accelerated deuterons thereon.

17. In neutron well logging apparatus, the combination of a pressure resistant housing adapted to be lowered into a well and containing a source of neutron flux emission therein, means for periodically interrupting the emission of neutrons from said source, first radioactivity indicating means including radioactivity responsive means in said housing, means rendering said first indicating means operative only at predetermined times during periods of interruption of said neutron emission, second radioactivity indicating means including radioactivity responsive means in said housing, and means rendering said second indicating means operative only at predetermined different times during periods of interruption of said neutron emission.

18. In neutron well logging apparatus, the combination of a pressure resistant housing adapted to be lowered into a well, a source of deuterons in the housing means providing a beam of the deuterons in said housing, relatively low voltage electric field establishing means for accelerating said deuterons to relatively low velocities, target means in the housing and in the path of said beam, and said beam providing means including a source of relatively low voltage DC having a negative terminal connected to said target means and a positive terminal connected to said deuteron source and grounded to said housing, said target means including tritium, whereby a flux of 14 mev. energy level, monoenergetic neutrons is produced when said low velocity deuterons impinge upon the target.

19. In neutron well logging apparatus, the combination of a pressure resistant housing adapted to be lowered into a well, a source of deuterons in the housing, relatively low voltage electric field establishing means for accelerating said deuterons to relatively low velocities, target means in the housing and in the path of said beam, and a source of relatively low voltage DC having a negative terminal connected to said target means and a positive terminal connected to said deuteron source and grounded to said housing.

20. In neutron well logging apparatus, the combination of a pressure resistant housing adapted to be lowered into a well, an evacuated envelope in said housing, and conducting electrode means in the housing made of getter material, whereby at elevated temperatures encountered in wells said electrodes aid in maintaining a low pressure in said evacuated envelope.

21. In neutron well logging apparatus, the combination of a pressure resistant housing adapted to be lowered into a well, a source of charged particles in the housing, electric field establishing means in the housing for accelerating said beam, target means in the path of said beam in the housing and adapted to emit neutrons when particles from said beam impinge thereupon, and corona discharge forming means for periodically reducing the electric field set up by said field establishing means to modulate the neutron emission from said target means.

22. In neutron well logging apparatus, the combination of a pressure resistant housing adapted to be lowered into a well, a source of charged particles in the housing, electric field establishing means in the housing for accelerating said beam, target means in the path of said beam in the housing and adapted to emit neutrons when particles from said beam impinge thereupon, and electrically energized means for periodically deflecting said beam to displace it relatively to the target means, thereby modulating the neutron emission from said target means.

23. In neutron well logging apparatus, the combination of a pressure resistant housing adapted to be lowered into a well, a source of charged particles in the housing, electric field establishing means in the housing for accelerating said beam, target means in the path of said beam in the housing and adapted to emit neutrons when particles from said beam impinge thereupon, beam interrupting means, means for moving said beam interrupting means periodically into and out of the path of said beam to interrupt the neutron emission from said target means, first radioactivity responsive indicating means rendered periodically operative while neutrons are being emitted by said target means, second radioactivity responsive indicating means rendered periodically operative at a given time during interruption of said neutron emission, and third radioactivity responsive indicating means rendered periodically operative at a different time during interruption of said neutron emission.

24. In a method of investigating earth formations traversed by a bore hole, the steps of emitting a high intensity flux of substantially monoenergetic, high energy neutrons in the bore hole to bombard the formations with the neutrons, whereby said neutrons are subjected to inelastic scattering resulting in the production of inelastic gamma radiation, and obtaining indications of said inelastic gamma radiation.

25. In a method of invetsigating earth formations traversed by a bore hole, the steps of emitting a high intensity flux of substantially monoenergetic, high energy neutrons in the bore hole to bombard the formations with the neutrons, and obtaining indications of gamma rays representative of both inelastic scattering of high energy neutrons and radioactive capture of slow neutrons by formation material.

26. In a method of investigating earth formations traversed by a bore hole, the steps of emitting a high intensity flux of substantially monoenergetic, high energy neutrons in the bore hole to bombard the formations with the neutrons, and obtaining indications simultaneously of gamma rays and of neutrons in at least one significant energy range produced by the bombardment of the surrounding formations by said high intensity neutron flux.

27. In a method of investigating earth formations traversed by a bore hole, the steps of emitting a high intensity flux of substantially monoenergetic high energy neutrons in the bore hole to bombard the formations with the neutrons, and obtaining indications simultaneously of gamma rays, relatively low energy neutrons representative of the absorption properties of the formations, intermediate energy neutrons representative of elastic scattering in the formations, ond other neutrons representative of the inelastic scattering properties of the formations, produced by the bombardment of the formations by said high intensity neutron flux.

28. In neutron well logging apparatus, the combination of a pressure resistant housing adapted to be lowered into a well, an envelope in said housing containing ions of a hydrogen gas, electrode means in said envelope containing molecules of a hydrogen gas on a surface thereof, and means for establishing a periodically varying electric field in said envelope to accelerate said ions in a beam towards said hydrogen gas containing surface of the electrode means to a velocity such that neutrons are produced as the ions impinge on said surface.

29. In neutron well logging apparatus, the combination of a pressure resistant, elongated housing adapted to be lowered into a well and having a longitudinal axis, means providing a beam of charged particles in said housing having the same direction as said axis, target means in the housing and in the path of said beam, said target means including means responsive to charged particles impinging thereon for emitting a high intensity flux of substantially monoenergetic, high energy neutrons, means for interrupting the neutron emission from said target means cyclically at a given rate of repetition such that neutron emission occurs and is interrupted during different parts of each operative cycle, radio-activity indiacting means including radioactivity responsive means in said housing, and means rendering said indicating means operative during said cycle.

30. In neutron well logging apparatus, the combination of a pressure resistant, elongated housing adapted to be lowered into a well and having a longitudinal axis, an envelope supported within said housing and containing an ionizable gas, means for producing ions of said gas in one portion of said envelope, target means disposed in another portion of said envelope longitudinally spaced apart from said one portion, said target means including means responsive to ions impinging thereon for emitting a high intensity flux of substantially monoenergetic, high energy neutrons, an elongated accelerating tube interposed between the one portion and the other portion of the envelope, and a negative voltage increasing in value toward the other portion of said envelope impressed on the tube for accelerating ions produced in said envelope one portion towards said target means.

31. In neutron well logging apparatus, the combination of a pressure resistant housing adapted to be lowered into a well, an envelope supported within said housing and containing an ionizable gas, ion source means including energized electrodes disposed within said envelope to ionize the gas and produce ions together with means for producing a magnetic field in a zone occupied by at least some of said electrodes to increase the ionization intensity and confine the region of ionization, target means disposed within said envelope in longitudinally spaced apart relation to said ion source means, said target means including means responsive to ions impinging thereon for emitting a high intensity flux of substantially monoenergetic, high energy neutrons, and means for accelerating ions within said envelope towards said target means.

32. In neutron well logging apparatus, the combination of a pressure resistant housing adapted to be lowered into a well, an envelope supported within said housing and containing an ionizable gas, ion source means including electrodes disposed within said envelope, means for energizing said electrodes to produce ions of said gas, an electrical impedance in circuit with at least one of said electrodes for controlling the ionization of said gas, target means disposed within said envelope in longitudinally spaced apart relation to said ion source means, said target means including means responsive to ions impinging thereon for emitting a high intensity flux of substantially monoenergetic, high energy neutrons, and means for accelerating ions within said envelope towards said target means.

33. In neutron well logging apparatus, the combination of a pressure resistant housing adapted to be lowered into a well, source means supported within said housing for providing charged particles, target means in the housing and including means responsive to charged particles impinging thereon for emitting a high intensity flux of substantially monoenergetic, high energy neutrons, controllable charged particle accelerator means interposed between said source means and said target means, and means for controlling the operative effectiveness of said accelerator means in imparting velocity to said charged particles to cause them to intercept said target means, thereby enabling adjustment of the intensity of neutron emission.

34. In neutron well logging apparatus, the combination of a pressure resistant housing adapted to be lowered into a well, an envelope in said housing, source and sink means for emitting and absorbing a selected gas, said source and sink means being in gas communication with said envelope for controlling gas pressure therein, means for ionizing said gas to form positively charged particles, target means in said envelope adapted to emit neutrons upon impingement of said particles thereon, and means for accelerating said charged particles towards said target means.

35. In neutron well logging apparatus, the combination of a pressure resistant housing adapted to be lowered into a well, an envelope in said housing, temperature responsive source and sink means in gas communication with said envelope for emitting and absorbing a selected gas, means for controlling the temperature of said source and sink means to regulate the gas pressure within said envelope, means for ionizing said gas to form positively charged particles, target means in said envelope adapted to emit neutrons upon impingement of said particles thereon, and means for accelerating said charged particles towards said target means.

36. In neutron well logging apparatus, the combination of a pressure resistant housing adapted to be lowered into a well, an envelope in said housing containing an ionizable gas, getter means in the envelope for maintaining the pressure in the envelope at a predetermined low level, means for ionizing said gas to form positively charged particles, means providing a directed beam of the charged particles, and target means in the housing and in the path of said beam, said target means including means responsive to charged particles impinging thereon for emitting neutrons.

37. In neutron well logging apparatus, the combination of a pressure resistant housing adapted to be lowered into a well and containing a source emitting a high intensity flux of substantially monoenergetic, high energy neutrons, means for interrupting the emission of neutrons from said source, radioactivity indicating means including radioactivity responsive means in said housing, and means rendering said indicating means operative only at predetermined times during periods of interruption of said neutron emission.

38. In a method for detecting atomic nuclei in materials, the steps of irradiating said material with pulsated fast monoenergetic neutrons, and detecting neutrons emitted from said material during the intervals between pulsations and after a substantial decay of the primary pulsated neutrons.

39. A method as described in claim 38, in which detection of neutrons emitted by said material is periodically effectuated.

40. A method according to claim 38, in which pulsated fast neutrons interact with said material to produce active gamma rays.

41. In a radioactivity well logging method, the steps of passing through a bore hole a source of pulsated fast neutrons and a detector of fast neutrons, and detecting neutrons only during the time interval between pulsations of neutrons and after a substantial decay of the primary pulsated neutrons.

42. A method according to claim 41, in which neutrons detected only during said time intervals are recorded.

43. A method according to claim 41, in which the detected neutrons are recorded as a function of depth in the bore hole.

44. Apparatus for radioactivity well logging comprising a housing adapted to be passed through a bore hole, a source of pulsated fast neutrons therein, a detector of fast neutrons also within said housing, and means for recording as a function of depth in the bore hole only neutrons detected during the time interval occurring between the neutron pulsations and after substantial decay of the primary pulsated neutrons.

45. Apparatus according to claim 44, in which the source of neutrons comprises a target and a source of pulsated ions.

46. Apparatus according to claim 44, in which the recording means comprise a gated circuit to control the operation of said neutron dectector.

47. A method for detecting certain atomic nuclei which react with neutrons to give active gamma radioisotopes comprising the steps of subjecting a material to be investigated to a pulsated fast monoenergetic neutrons, and periodically detecting gamma rays radiated by said material during time intervals occurring between the neutron pulsations and after substantial decay of the primary pulsated neutrons.

48. A method according to claim 47, in which said detected atomic nuclei are in the presence of different atomic nuclei.

49. In a radioactivity well logging method, the steps of passing through a bore hole a source of pulsated fast neutrons in combination with a detector of gamma rays, and detecting gamma rays only during time intervals occuring between the neutron pulsations and after substantial decay of the primary neutrons.

50. A method according to claim 49, in which only said gamma rays are detected.

51. A method according to claim 50, in which only the detected gamma rays are recorded as a function of depth in the bore hole.

52. Apparatus for radioactivity well logging comprising a housing adapted to be passed through a bore hole, a source of pulsated fast neutrons therein, means for detecting gamma rays also within said housing, and means for recording as a function of depth in the bore hole only gamma rays detected during the time intervals occurring between the neutron pulsations and after substantial decay of the primary pulsated neutrons.

53. Apparatus according to claim 52, in which the source of neutrons comprises a target and a source of pulsated ions.

54. In a logging apparatus, a pulsed source of neutrons for irradiating at least one material to be examined and a detector adapted to be placed in proximity to said material, an indicator coupled to said detector, a signal source coupled to said neutron source and to said detector whereby a time dependent indication of the characteristics of said material is obtained.

55. In a logging apparatus a pulsed source of neutrons for iradiating at least one material to be examined and a detector adapted to be placed in proximity to said material, an indicator coupled to said detector, a timed signal source coupled to said neutron source and to said indicator whereby a time dependent indication of the characteristics of said material is obtained.

56. In a logging apparatus, pulsed source of neutrons for irradiating at least one material to be examined, and a detector of the reflected and induced products of said neutron irradiation, adapted to be placed in proximity to said material, an indicator coupled to said detector, and a timed signal source coupled to said neutron source and to said indicator to control the time of neutron emission whereby a time dependent indication of the characteristics of said material is obtained.

57. A logging apparatus comprising a pulsed neutron source and a detector adapted to be lowered into a well to determine the characteristics of strata pierced by the well, means for lowering the neutron source and detector into said well, a timed signal source coupled to said neutron source and to an indicator of the reflected and induced products of the neutron irradiation from the neutron source so that the energy received by the detector and the pulse timing of the neutron source is correlated with the depth of the detector in the well to obtain a time dependent indication of the characteristics of said strata.

58. In a method of geophysical prospecting an earth formation traversed by a fluid-containing bore hole, the combination of steps that comprises traversing the bore hole in the vicinity of a formation about which information is desired with an instrument comprising a source of radioactive radiation and a detector of radiation returning from the formation as a result of exposure to said radioactive radiation, subjecting the formation to said radiation for a predetermined time interval, discontinuing irradiation of the formation, and deriving from said detector an output indication of detected radiation only during a period beginning a preselected time after discontinuance of said radiation.

59. The method according to claim 58 further comprising continuously repeating the foregoing sequence of steps during traversal of the formation by said instrument and wherein the period during which an output indication is derived terminates prior to the succeeding radiation interval.

60. In the logging of a fluid-containing bore hole traversing at least one earth formation about which information is desired, the method which comprises passing through said bore hole a source of neutrons and a detector of radiation resulting from irradiation of an earth formation by neutrons from the source, causing said source to emit a burst of neutrons for irradiating an earth formation about which information is desired, and subsequent to the termination of said neutron burst and after a further time interval, detecting radiation emitted from the formation as a result of said burst to the substantial exclusion of radiation emitted during said burst and further time interval.

61. For use in investigating earth formations, radioactivity logging apparatus comprising, an intermittently operating source of substantially monoenergetic neutrons adapted by irradiating said formation to induce said formations to themselves produce radiation, and detector means disposed relative to said source to simultaneously detect neutrons and gamma radiation emitted from said formations in response to irradiation thereof by neutrons from said source.

62. For use in investigating earth formations, radioactivity logging apparatus comprising, an intermittently operating neutron source adapted by irradiating said formations to induce said formations to themselves emit radiation, detector means disposed relative to said source to simultaneously detect neutrons and gamma radiation emitted from said formations in response to irradiation thereof by neutrons from said source, and means coupled to said detecting means for providing separate indications of said simultaneously detected neutrons and gamma radiation.

References Cited

UNITED STATES PATENTS 2,303,688   12/1942   Fearon.
2,508,772   5/1950   Pontecorvo.

ARCHIE R. BORCHELT, Primary Examiner

U.S. Cl. X.R.

250—83, 84; 313—61

UNITED STATES PATENT OFFICE
CERTIFICATE OF CORRECTION

Patent No. 3,461,291                                            August 12, 196

Clark Goodman

It is certified that error appears in the above identified patent and that said Letters Patent are hereby corrected as shown below:

Column 2, line 55, "deutrons" should read -- deuterons --. Column 3, line 15, "characteriized" should read -- characterize --. Column 4, line 35, "an" should read -- as --; line 44, "connector" should read -- connected --; line 44, "be" should read -- the --. Column 5, line 3, "cf" should read -- cm --; li 18 to 21 should read -- The walls of the chamber 22 effectively shield its interior from electric fields generated by the high potentials used in the accelerator tube 19, referred to in greater detail hereinafter. --. Column 10, lines 74 and 75, "arrangements" should read -- measurements --. Column 12, line 69, after "connected" insert -- to --. Column 14, line 6, "deutrons" should read -- deuterons --. Column 16, lines 3 and 4, "indiacting" should read -- indicating --. Column 18, line 3{ "iradiating" should read -- irradiating --; line 43, before "pulsed" insert -- a --

Signed and sealed this 12th day of May 1970.

(SEAL)
Attest:

EDWARD M. FLETCHER, JR.                            WILLIAM E. SCHUYLER, J
Attesting Officer                                          Commissioner of Patent